(12) United States Patent
Kim et al.

(10) Patent No.: US 8,355,011 B2
(45) Date of Patent: Jan. 15, 2013

(54) RESISTIVE TOUCH SCREEN

(75) Inventors: Woon Chun Kim, Gyunggi-do (KR); Yong Soo Oh, Gyunggi-do (KR); Jong Young Lee, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 385 days.

(21) Appl. No.: 12/823,459

(22) Filed: Jun. 25, 2010

(65) Prior Publication Data

US 2011/0227861 A1    Sep. 22, 2011

(30) Foreign Application Priority Data

Mar. 22, 2010  (KR) .................. 10-2010-0025375

(51) Int. Cl.
*G06F 3/045* (2006.01)

(52) U.S. Cl. ........................ 345/174; 345/176

(58) Field of Classification Search .................. 345/173, 345/174, 175, 176, 177; 349/155; 178/18.01–18.11
See application file for complete search history.

(56) References Cited

U.S. PATENT DOCUMENTS 7,499,142 B2 *   3/2009  Jeon et al. ............. 349/155
2007/0263165 A1 * 11/2007  Sung et al. ............ 349/187

* cited by examiner

*Primary Examiner* — Hoa T Nguyen
*Assistant Examiner* — Andrew Sasinowski
(74) *Attorney, Agent, or Firm* — Blakely Sokoloff Taylor & Zafman LLP (57) ABSTRACT

Disclosed herein is a resistive touch screen, including: a transparent film 100 that has a first transparent electrode 110 and is bent when the transparent film 100 is pressed; a dot spacer 200 that is formed on one surface of the first transparent electrode 110 and is configured to include a plurality of projection members 210; a transparent substrate 300 that has a second transparent electrode 310; and an adhesive layer 400 that adheres the edge of the transparent film 100 to the edge of the transparent substrate 300, wherein the side surfaces of the plurality of projection members 210 are closely adhered to each other but when the transparent film 100 is bent, the side surfaces of the plurality of projection members 210 are spaced from each other.

7 Claims, 6 Drawing Sheets

RESISTIVE TOUCH SCREEN

CROSS REFERENCE TO RELATED APPLICATION

This application claims the benefit of Korean Patent Application No. 10-2010-0025375, filed on Mar. 22, 2010, entitled "Resistive Touch Screen", which is hereby incorporated by reference in its entirety into this application.

BACKGROUND OF THE INVENTION

1. Technical Field

The present invention relates to a resistive touch screen.

2. Description of the Related Art

Alongside the growth of computers using digital technology, devices assisting the computers have also been developed, and personal computers, portable transmitters and other personal information processors execute processing of text and graphics using a variety of input devices such as a keyboard, a mouse and so on.

While the rapid advancement of the information-based society has been widening the use of computers more and more, there have been occurring the problems of it being difficult TO efficiently operate products using only the keyboard and mouse as being responsible for the input device function. Thus, the demand for a device which is simple, does not malfunction, and has the capability to input easily is increasing.

Furthermore, current techniques for input devices exceed the level of fulfilling general functions and thus are progressing towards techniques related to high reliability, durability, innovation, designing and manufacturing. To this end, a touch screen has been developed as an input device capable of inputting information such as text and graphics.

The touch screen is mounted on the display surface of an image display device such as an electronic organizer, a flat panel display including a liquid crystal display (LCD), a plasma display panel (PDP), an electroluminescence (El) element or the like, or a cathode ray tube (CRT), so that a user selects the information desired while viewing the image display device.

The touch screen is classifiable as a resistive type, a capacitive type, an electromagnetic type, a surface acoustic wave (SAW) type, and an infrared type. The type of touch screen selected is one that is adapted for an electronic product in consideration of not only signal amplification problems, resolution differences and the degree of difficulty of designing and manufacturing technology but also in light of optical properties, electrical properties, mechanical properties, resistance to the environment, input properties, durability and economic benefits of the touch panel. In particular, resistive and capacitive types are prevalently used.

Among others, the resistive touch screen is generally manufactured having a structure in which an upper film and a lower substrate on which transparent electrodes are coated are opposite to each other, having a dot spacer therebetween. Reviewing the driving process of the resistive touch screen, when the upper film is touched, it is bent to allow the transparent electrodes coated on the upper film and the lower substrate, respectively, to come in contact with each other, such that the voltage applied to the transparent electrodes is changed. A touched position is sensed by measuring the changes in the voltage. The resistive touch screen has a simple structure, such that it can be easily manufactured at low manufacturing costs and can be reduced in size.

However, in the resistive touch screen according to the related art, the dot spacer is formed on the transparent electrode of the lower substrate. Therefore, when the upper film is drooped, undesirable contact may occur between the transparent electrode on the upper film and the transparent electrode on the lower substrate, having the dot spacer therebetween. In order to solve the problem, there has been proposed to form the dot spacer on the transparent electrode of the upper film.

However, the upper film is bent whenever it is touched. Therefore, when the dot spacer is formed on the transparent electrode of the upper film, stress is applied to the upper surface edge of the dot spacer that is directly fixed to the transparent electrode, causing a problem that the dot spacer becomes detached from the transparent electrode.

SUMMARY OF THE INVENTION

The present invention has been made in an effort to provide a resistive touch screen that forms a dot spacer configured to include a plurality of projection members on a transparent electrode of an upper film to prevent the dot spacer from being detached from the transparent electrode.

A resistive touch screen according to an embodiment of the present invention includes: a transparent film that has a first transparent electrode formed on one surface of the transparent film and is bent when the other surface of the transparent film is pressed; a dot spacer that is formed on one surface of the first transparent electrode and is configured to include a plurality of projection members; a transparent substrate that has a second transparent electrode formed on one surface of the transparent substrate; and an adhesive layer that adheres the edge of the transparent film to the edge of the transparent substrate so that the first transparent electrode is opposite to the second transparent electrode, wherein the side surfaces of the plurality of projection members are closely adhered to each other but when the transparent film is bent, the side surfaces of the plurality of projection members are spaced apart from each other.

Herein, the plurality of projection members include central projection members disposed in the center and outer projection members surrounding the central projection members in a circular form.

Further, the plurality of projection members are disposed in a circular form so that a cavity surrounded by the plurality of projection members is formed.

Further, the plurality of projection members have the same height.

Further, as the plurality of projection members become closer to the edges, the plurality of projection members have the heights that become higher.

Further, as the plurality of projection members become closer to the edges, the plurality of projection members have the heights that become lower.

Further, as the plurality of projection members become closer to the edges, the radius of curvature at the distal end of the projection members becomes larger.

DESCRIPTION OF THE PREFERRED EMBODIMENTS

The features and advantages of the present invention will be more obvious from the following description with reference to the accompanying drawings.

Terms or words used in the specification and claims herein should be not construed as a general and lexical meaning and should be construed as the meaning and concept meeting the technical idea of the present invention based on a principle that the present inventors can properly define the concepts of terms in order to elucidate their own invention in the best method.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms. Further, in describing the present invention, a detailed description of related known functions or configurations will be omitted so as not to obscure the subject of the present invention.

Hereinafter, exemplary embodiments of the present invention will be described in detail with reference to the accompanying drawings.

Figure 1:
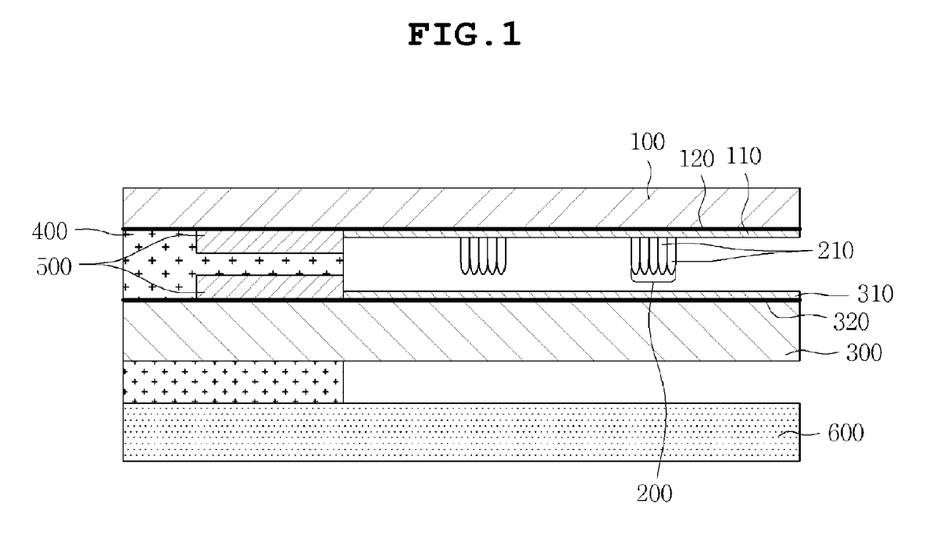
FIG. 1 is a cross-sectional view of a resistive touch screen according to an exemplary embodiment of the present invention.

FIG. 1 is a cross-sectional view of a resistive touch screen according to an exemplary embodiment of the present invention.

Figure 2A:
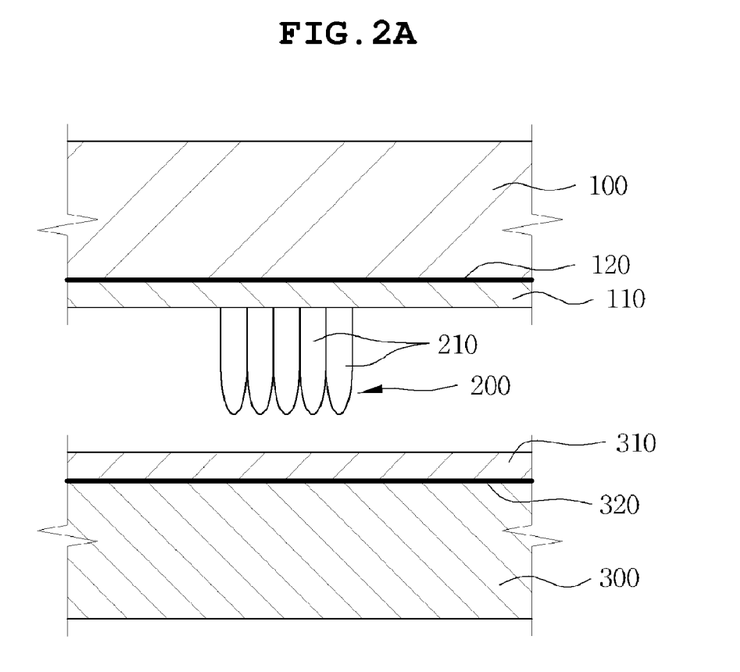
FIGS. 2A and 2B are cross-sectional views showing an operation process of a dot spacer according to an exemplary embodiment of the present invention.
Figure 2B:
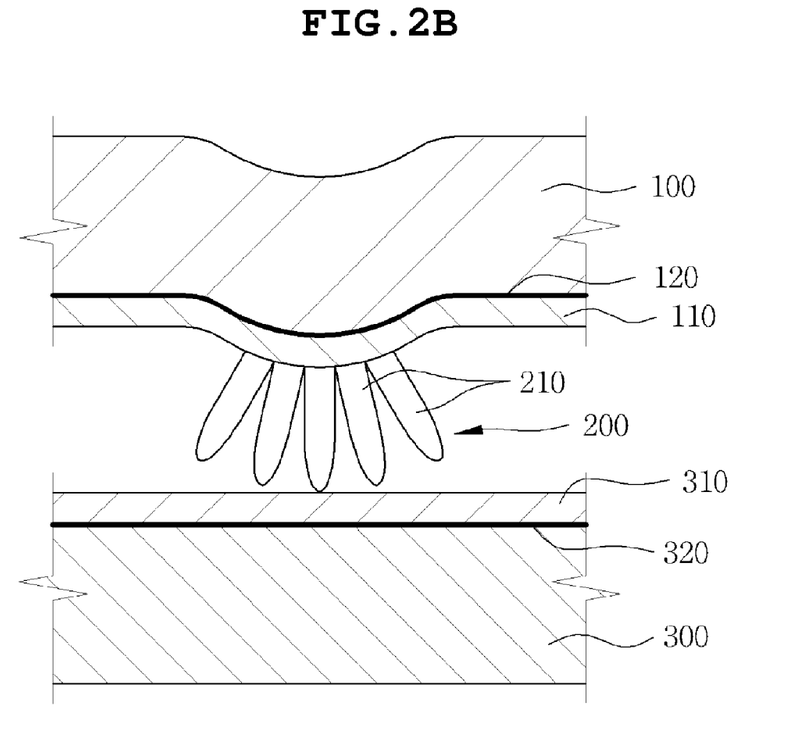

As shown in FIG. 1, the resistive touch screen according to the present embodiment includes a transparent film 100 that has a first transparent electrode 110 formed on one surface of the transparent film 100 and is bent when the other surface of the transparent film 100 is pressed; a dot spacer 200 that is formed on one surface of the first transparent electrode 110 and is configured to include a plurality of projection members 210; a transparent substrate 300 that has a second transparent electrode 310 formed on one surface of the transparent substrate 300; and an adhesive layer 400 that adheres the edge of the transparent film 100 to the edge of the transparent substrate 300 so that the first transparent electrode 110 is opposite to the second transparent electrode 310, wherein the side surfaces of the plurality of projection members 210 are closely adhered to each other but when the transparent film 100 is bent, the side surfaces of the plurality of projection members 210 are spaced apart from each other (see FIGS. 2A and 2B).

When the transparent film 100 is pressed by a user's body or a specific object, it is bent to allow the first transparent electrode 110 and the second transparent electrode 310 to come in contact with each other. Further, the first transparent electrode 110 is formed on one surface of the transparent film 100. Therefore, in order to improve adhesion between the transparent film 100 and the first transparent electrode 110, it is preferable that a surface processing surface 120 is formed by performing a high frequency processing, a primer processing or the like on one surface of the transparent film 100.

When pressure is applied to the other surface of the transparent film 100, the first transparent electrode 110 contacts the second transparent electrode 310 to change voltage, thereby allowing a controller to recognize the touched coordinates. Herein, the material of the first transparent electrode 110 is not particularly limited, but may include a conductive polymer having excellent flexibility and a simple coating process as well as indium tin oxide (ITO) that is commonly used. At this time, the conductive polymer includes poly-3,4-ethylenedioxythiophene/polystyrene sulfonate (PEDOT/PSS), polyaniline, polyacetylene, polyphenylenevinylene, or the like.

The transparent substrate 300 should not be bent even though it is pressed, different from the transparent film 100. Therefore, the material of the transparent substrate 300 is not particularly limited, insofar as it has a predetermined strength or more, but may include polyethylene terephthalate (PET), polycarbonate (PC), polymethylmethacrylate (PMMA), polyethylenenaphthalate (PEN), polyethersulfone (PES), cyclic olefin polymer (COC), triacetylcellulose (TAC) film, polyvinyl alcohol (PVA) film, polyimide (PI) film, polystyrene (PS), biaxially oriented polystyrene (BOPS; containing K resin), glass or reinforced glass and so on. Further, the second transparent electrode 310 is formed on one surface of the transparent substrate 300. Therefore, in order to improve adhesion between the transparent substrate 300 and the second transparent electrode 310, it is preferable that a surface processing surface 320 is formed by performing a high frequency processing, a primer processing or the like on one surface of the transparent film 300.

As described above, when pressure is applied to the transparent film 100, the second transparent electrode 310 contacts the first transparent electrode 110 that is opposite thereto to allow a controller to recognize the touched coordinates. Herein, the material of the second transparent electrode 310 may also include indium tin oxide (ITO), a conductive polymer or the like, in the same manner as that of the first transparent electrode 110.

Meanwhile, an electrode 500 that receives electrical signals from the first transparent electrode 110 and the second transparent electrode 310 is printed on the edges of the first transparent electrode 110 and the second transparent electrode 310 by a silk screen printing method, a gravia printing method, an inkjet printing method or the like. At this time, the electrode 500 may be made of silver (Ag) paste or organic Ag having superior electrical conductivity, but the present invention is not limited thereto. In addition, a conductive polymer material, carbon black (including carbon nanotubes), or a low resistive metal including metal or a metal oxide such as ITO may be used.

The adhesive layer 400 serves to allow the first transparent electrode 110 and the second transparent electrode 310 to be opposite to each other by adhering the edge of the transparent film 100 to the edge of the transparent substrate 300. Herein, the material of the adhesive layer 400 is not particularly limited, but may include an optical clear adhesive (OCA) or a double adhesive tape (DAT).

When a user's pressure is applied, the dot spacer 200 relieves impact between the first transparent electrode 110 and the second transparent electrode 310, and when the user's pressure is removed, the dot spacer 200 provides repulsive force so that the first transparent electrode 110 is returned to its original position, thereby allowing the first transparent electrode 110 and the second transparent electrode 310 to be insulated from each other. Further, in the present invention, the dot spacer 200 is configured to include the plurality of projection members 210, different from the related art. Therefore, various embodiments of the dot spacer 200 will be described in detail with reference to the drawings.

FIGS. 2A and 2B are cross-sectional views showing an operational process of a dot spacer according to an exemplary embodiment of the present invention.

As shown in FIGS. 2A and 2B, side surfaces of the plurality of projection members 210 are closely adhered to each other before the transparent film 100 is bent (see FIG. 2A) and they are spaced apart from each other when the transparent film 100 is bent by pressure (see FIG. 2B). Therefore, even though the transparent film 100 is bent, stress is distributed to each projection member 210, thereby making it possible to prevent the dot spacer 200 from being detached from the first transparent electrode 110. Further, since the dot spacer 200 is configured to include the plurality of projection members 210, force applied to the dot spacer 200 is distributed when the dot spacer 200 contacts the second transparent electrode 310, thereby making it possible to prevent the dot spacer 200 from being broken.

Figure 3:
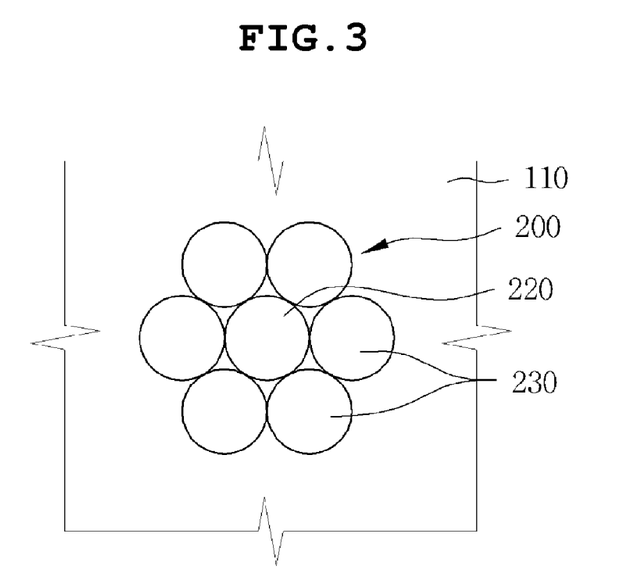
FIGS. 3 to 5 are plan views showing various patterns of the dot spacer of FIG. 1.
Figure 4:
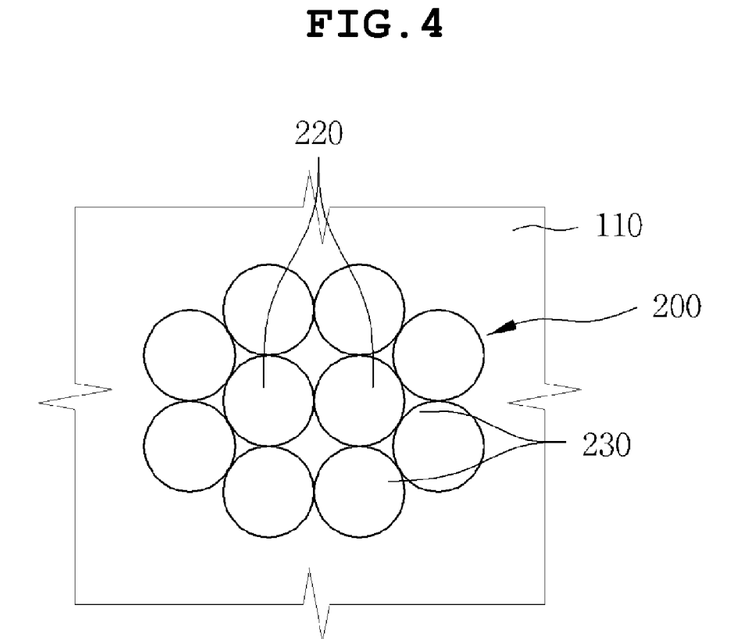
Figure 5:
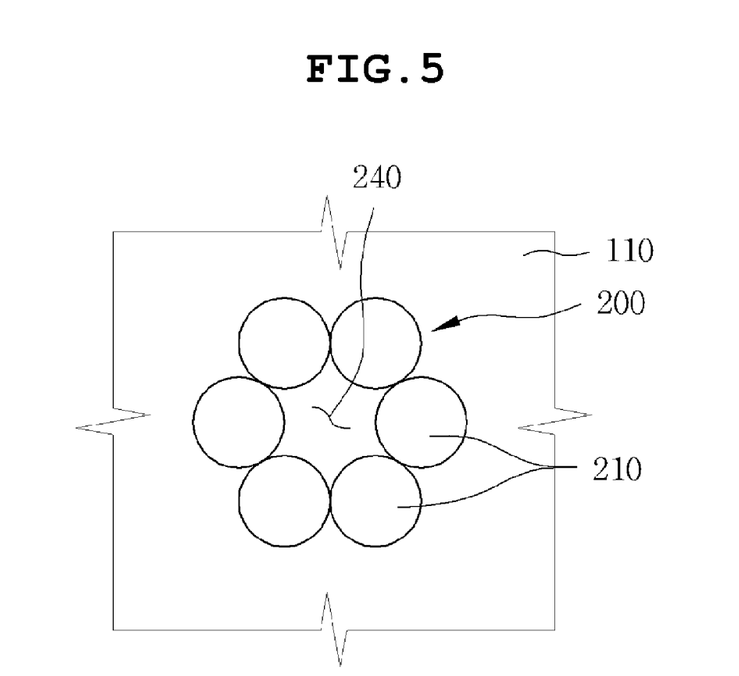

Meanwhile, FIGS. 3 to 5 are plan views showing various patterns of the dot spacer of FIG. 1.

As shown in FIGS. 3 to 5, the plurality of projection members may be formed in various patterns. For example, one or two central projection members 220 may be disposed in the center and the plurality of outer projection members 230 may be disposed so as to surround the central projection members 220 in a circular form (see FIGS. 3 and 4). Further, the plurality of projection member 210 may be disposed in a circular form so that a cavity 240 surrounded by the plurality of projection member 210 is formed, except for the central projection members 220 (see FIG. 5). The plurality of projection members 210 are disposed in a circular form by way of example. Therefore, the plurality of projection members 210 may also be disposed in various patterns within the range obvious to those skilled in the art.

Meanwhile, as described above, the plurality of projection members 210 may be formed to have the same height or different heights.

Figure 6A:
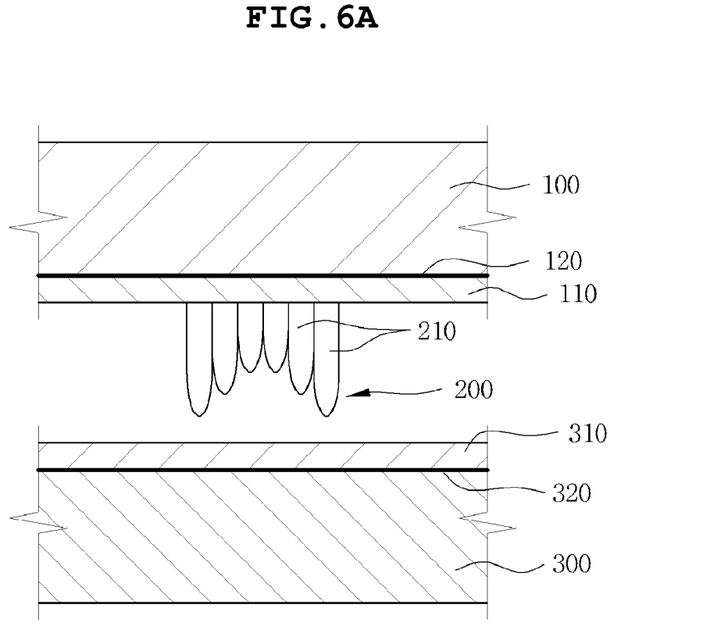
FIGS. 6 to 8 are cross-sectional views showing an operation process of a dot spacer according to another exemplary embodiment of the present invention.
Figure 6B:
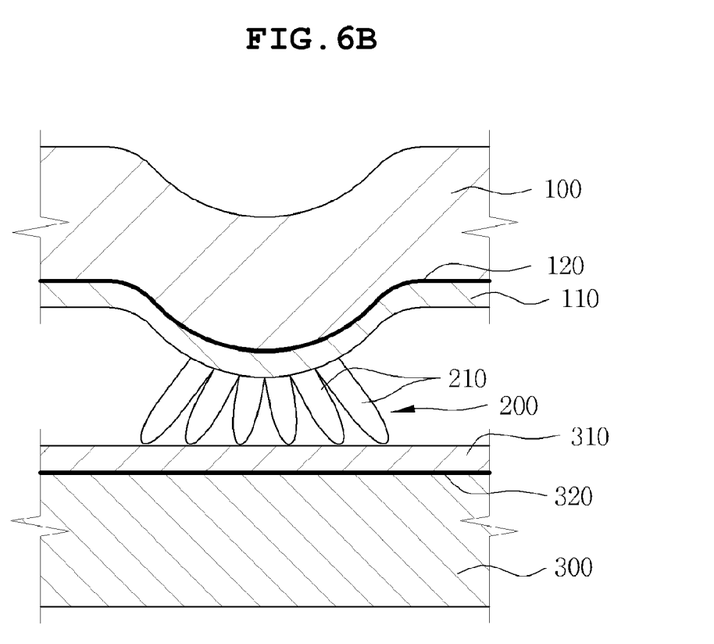

FIGS. 6 to 8 are cross-sectional views showing an operation process of a dot spacer according to another exemplary embodiment of the present invention. For example, the heights of the plurality of projection members 210 may become higher as the plurality of projection members 210 become closer to the edges (see FIGS. 6A and 6B). In this case, when the transparent film 100 is bent by the user's pressure, the heights of the plurality of projection members 210 contacting the second transparent electrode 310 become finally identical even though the rotation amount of the projection members 210 is increased as the plurality of projection members 210 become closer to the edges thereof. Therefore, the force that is applied to the dot spacer 200 is evenly distributed, thereby making it possible to prevent the dot spacer 200 from being broken.

Figure 7A:
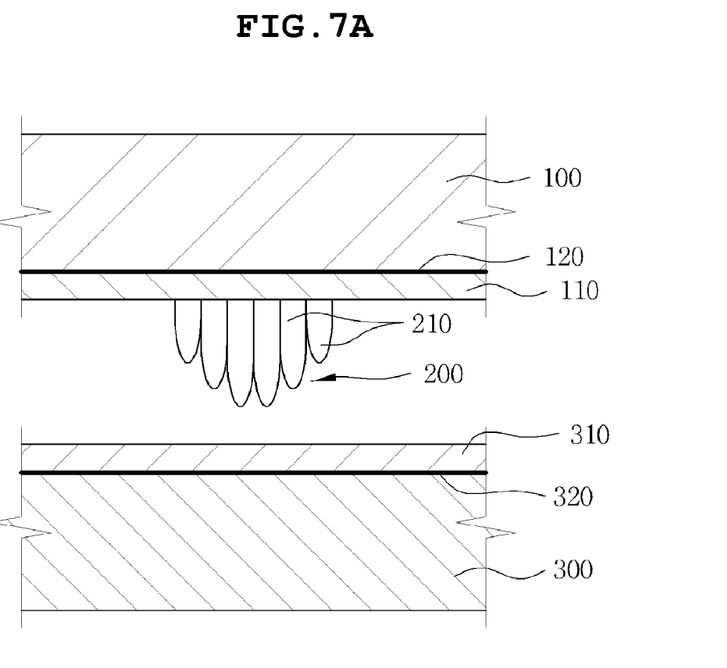
Figure 7B:
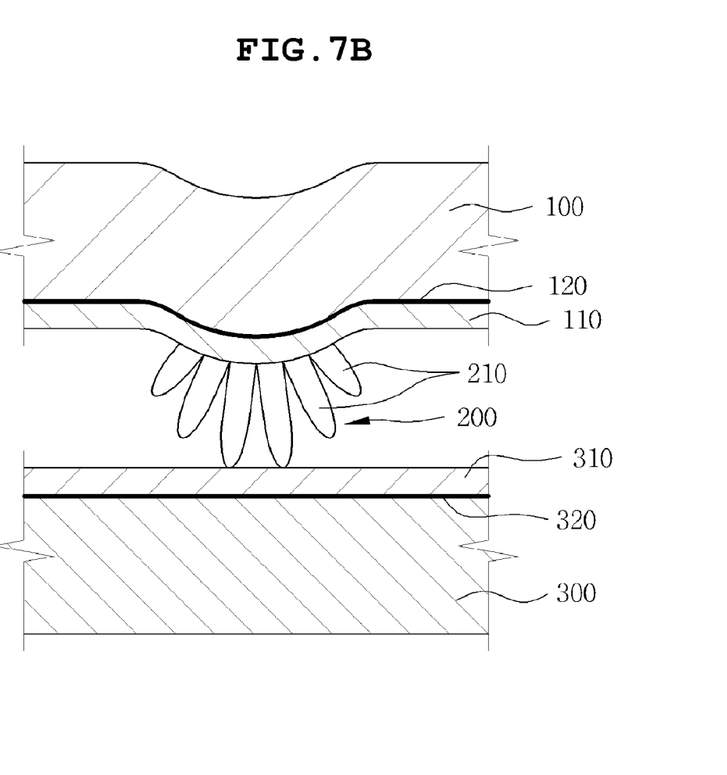

On the contrary, the heights of the plurality of projection members 210 may become lower as the plurality of projection members 210 become closer to the edges thereof (see FIGS. 7A and 7B). In this case, since the rotation amount of the projection members 210 becomes larger as it becomes closer to the edge when the transparent film 100 is bent by the user's pressure, the difference in heights of the plurality of projection members 210 contacting the second transparent electrode 310 is eventually increased. Finally, the projection members 210 in the center contact first the second transparent electrode 310 and then the projection members 210 in the edges contact the second transparent electrode 310 in sequence. Therefore, the force applied to the dot spacer 200 is distributed with time difference, making it possible to prevent the dot spacer 200 from being broken.

Figure 8A:
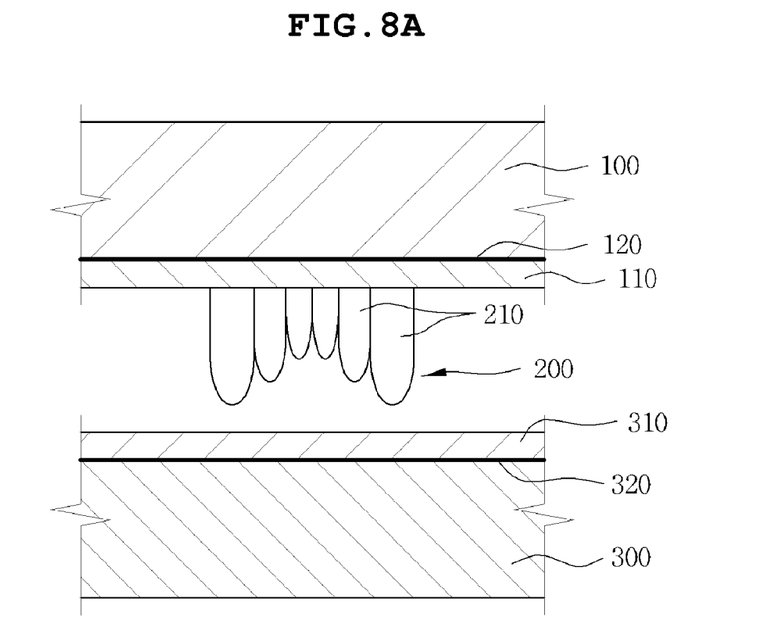
Figure 8B:
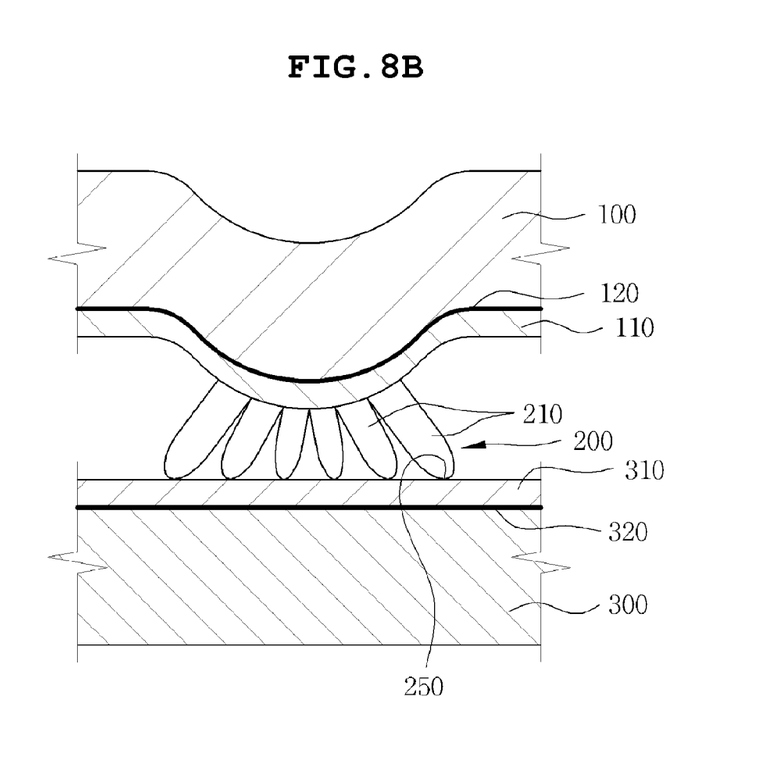

Meanwhile, as the plurality of projection members 210 become closer to the edges, the radius of curvature at the distal end of the projection members 210 becomes larger (see FIGS. 8A and 8B). The reason is to prevent the second transparent electrode 310 from being damaged by widening the area of the projection members 210 contacting the second transparent electrode 310 at maximum. More specifically, when the transparent film 100 is bent by the user's pressure, the rotation amount of the projection members 210 is increased as the projection members 210 become closer to the edges thereof. Therefore, the side surface of the projection members 210 in a straight line rather than the distal end of the projection members 210 in a curved line may contact and damage the first transparent electrode 310. Therefore, the present invention has the radius of curvature at the distal end of the plurality of projection members 210 that becomes larger as the projection members 210 become closer to the edges thereof, such that the distal ends 250 in a curved line of the projection members 210 provided at the edges are also in contact with the second transparent electrode 310, thereby making it possible to prevent the second transparent electrode 310 from being damaged.

In addition, a display panel 600 may be adhered to the other surface of the transparent substrate 300 using an optical clear adhesive (OCA) (see FIG. 1). Herein, the display panel serves to output an image and includes a liquid crystal display device (LCD), a plasma display panel (PDP), an electroluminescence (EL), a cathode ray tube (CRT) or the like.

According to the present invention, the dot spacer configured to include the plurality of projection members is used, such that the plurality of projection members can distribute stress even if the upper film is bent. Therefore, the present invention can prevent the dot spacer from being detached from the transparent electrode, even though the dot spacer is formed on the transparent electrode of the upper film.

Further, according to the present invention, the dot spacer is configured to include the plurality of projection members to distribute the force applied to the dot spacer when being touched, thereby making it possible to prevent the dot spacer from being damaged even though excessive force is applied or the dot spacer is repeatedly used for a long period.

Although the embodiment of the present invention has been disclosed for illustrative purposes, it will be appreciated that a resistive touch screen according to the invention is not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:
1. A resistive touch screen, comprising:
a transparent film that has a first transparent electrode formed on one surface of the transparent film and is bent when the other surface of the transparent film is pressed;
a dot spacer that is formed on one surface of the first transparent electrode and is configured to include a plurality of projection members;
a transparent substrate that has a second transparent electrode formed on one surface of the transparent substrate; and an adhesive layer that adheres the edge of the transparent film to the edge of the transparent substrate so that the first transparent electrode is opposite to the second transparent electrode,
wherein the side surfaces of the plurality of projection members are closely adhered to each other but when the transparent film is bent, the side surfaces of the plurality of projection members are spaced apart from each other.

2. The resistive touch screen as set forth in claim 1, wherein the plurality of projection members include:
   central projection members disposed in the center; and
   outer projection members surrounding the central projection members in a circular form.

3. The resistive touch screen as set forth in claim 1, wherein the plurality of projection members are disposed in a circular form so that a cavity surrounded by the plurality of projection members is formed.

4. The resistive touch screen as set forth in claim 1, wherein the plurality of projection members have the same height.

5. The resistive touch screen as set forth in claim 1, wherein as the plurality of projection members becomes closer to the edges, the plurality of projection members have the heights that become higher.

6. The resistive touch screen as set forth in claim 1, wherein as the plurality of projection members become closer to the edges, the plurality of projection members have the heights that become lower.

7. The resistive touch screen as set forth in claim 1, wherein as the plurality of projection members become closer to the edges, the radius of curvature at the distal end of the projection members becomes larger.

* * * * *